(12) United States Patent
Sadowsky et al.

(10) Patent No.: US 8,396,147 B2
(45) Date of Patent: *Mar. 12, 2013

(54) MIMO TRANSMITTER FOR TRANSMITTING A GROUP OF SEQUENTIAL OFDM SYMBOLS USING A PLURALITY OF ANTENNAS

(75) Inventors: John S. Sadowsky, Mesa, AZ (US); Minnie Ho, Los Altos, CA (US); Eric A. Jacobsen, Scottsdale, AZ (US); Alexander A. Maltsev, Nizhny Novgorod (RU); Ali S. Sadri, San Diego, CA (US); Sumeet Sandhu, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 378 days.

This patent is subject to a terminal disclaimer.

(21) Appl. No.: 12/757,117

(22) Filed: Apr. 9, 2010

(65) Prior Publication Data

US 2010/0195545 A1 Aug. 5, 2010

Related U.S. Application Data

(63) Continuation of application No. 12/118,838, filed on May 12, 2008, now Pat. No. 7,738,579, which is a continuation of application No. 10/750,587, filed on Dec. 29, 2003, now Pat. No. 7,394,858.

(60) Provisional application No. 60/493,937, filed on Aug. 8, 2003.

(51) Int. Cl.
*H04K 1/10* (2006.01)
*H04L 27/28* (2006.01)

(52) U.S. Cl. ........ 375/260; 375/267; 375/347; 375/299; 375/343; 455/506; 455/65; 455/101; 455/137

(58) Field of Classification Search .................. 375/260, 375/267, 347, 299, 343; 455/500, 504, 506, 455/101, 65, 137; 370/208
See application file for complete search history.

(56) References Cited

U.S. PATENT DOCUMENTS 6,473,467 B1 10/2002 Wallace et al.
7,027,523 B2 4/2006 Jalali et al.
(Continued)

FOREIGN PATENT DOCUMENTS

JP 11-163823 A 6/1999
JP 2001-177497 A 6/2001
(Continued)

OTHER PUBLICATIONS

U.S. Appl. No. 12/118,838, Non Final Office Action mailed Aug. 3, 2009, 13 pgs.

(Continued)

*Primary Examiner* — Phuong Phu
(74) *Attorney, Agent, or Firm* — Schwegman, Lundberg & Woessner, P.A.

(57) ABSTRACT

A MIMO transmitter and method for transmitting a group of sequential OFDM symbols on a downlink channel using a plurality of antennas is disclosed herein. Groups of OFDM subcarriers are individually modulated in accordance with spatial-frequency subcarrier modulation assignments to generate groups of symbol-modulated subcarriers, corresponding symbol-modulated subcarriers are combined for transmission on each of a plurality of spatial channels, and beamforming is performed on the combined symbol-modulated subcarriers for transmission over the spatial channels. The channel comprises a plurality of the groups of the OFDM subcarriers and the OFDM subcarriers within each group of subcarriers and within each group of sequential OFDM symbols have the same spatial-frequency subcarrier modulation assignments. The spatial-frequency subcarrier modulation assignments for each group are determined based on feedback by a receiver, which is determined from spatial channel characteristics of the spatial channels.

10 Claims, 4 Drawing Sheets

U.S. PATENT DOCUMENTS

| | | | |
|---|---|---|---|
| 7,072,413 B2 | 7/2006 | Walton et al. | |
| 7,072,523 B2 | 7/2006 | Bolle et al. | |
| 7,154,936 B2 | 12/2006 | Bjerke et al. | |
| 7,218,689 B2 | 5/2007 | Gupta | |
| 7,394,858 B2 * | 7/2008 | Sadowsky et al. | 375/260 |
| 7,639,600 B1 | 12/2009 | Lou et al. | |
| 7,738,579 B2 * | 6/2010 | Sadowsky et al. | 375/260 |
| 7,822,135 B2 * | 10/2010 | Sadowsky et al. | 375/260 |
| 7,885,346 B2 * | 2/2011 | Sadowsky et al. | 375/260 |
| 8,019,010 B2 * | 9/2011 | Sadowsky et al. | 375/260 |
| 2002/0154705 A1 | 10/2002 | Walton et al. | |
| 2003/0231715 A1 | 12/2003 | Shoemake et al. | |
| 2004/0082356 A1 | 4/2004 | Walton et al. | |
| 2004/0165558 A1 | 8/2004 | Ling et al. | |
| 2004/0165676 A1 | 8/2004 | Krishnan et al. | |
| 2004/0233918 A1 | 11/2004 | Larsson et al. | |
| 2005/0147076 A1 | 7/2005 | Sadowsky et al. | |
| 2006/0018411 A1 | 1/2006 | Gore et al. | |
| 2008/0253471 A1 | 10/2008 | Sadowsky et al. | |
| 2009/0245405 A1 | 10/2009 | Sadowsky et al. | |
| 2009/0252257 A1 | 10/2009 | Sadowsky et al. | |
| 2011/0096856 A1 | 4/2011 | Sadowsky et al. | |

FOREIGN PATENT DOCUMENTS

| | | |
|---|---|---|
| WO | 03/001702 A1 | 1/2003 |
| WO | 03/034610 A2 | 4/2003 |
| WO | 03/047118 A2 | 6/2003 |
| WO | 03/049397 A2 | 6/2003 |
| WO | 2005/022681 A2 | 3/2005 |
| WO | 2005/022681 A3 | 7/2005 |

OTHER PUBLICATIONS

U.S. Appl. No. 12/118,838, Preliminary Amendment filed Aug. 12, 2009, 5 pgs.

U.S. Appl. No. 12/118,838, Response filed Nov. 2, 2009 to Non Final Office Action mailed Aug. 3, 2009, 8 pgs.

U.S. Appl. No. 12/118,838, Supplemental Notice of Allowability Mailed May 6, 2010, 4 pgs.

U.S. Appl. No. 12/482,671 Supplemental Notice of Allowability Mailed Sep. 23, 2010, 3 pgs.

U.S. Appl. No. 12/482,689 Notice of Allowance mailed Oct. 1, 2010, 7 pgs.

U.S. Appl. No. 12/482,689, Non-Final Office Action mailed May 25, 2010, 10 pgs.

U.S. Appl. No. 12/482,689, Response filed Aug. 20, 2010 to Non Final Office Action mailed May 25, 2010, 8 pgs.

U.S. Appl. No. 12/982,161, Notice of Allowance mailed May 13, 2011, 9 pgs.

Chinese Application Serial No. 201010251797.4, Office Action mailed May 20, 2011, 4 pgs.

Chinese Application Serial No. 201010251809.3, Office Action mailed Feb. 1, 2011, 6 pgs.

International Application Serial No. PCT/US2004/025509, International Search Report mailed Mar. 29, 2005, 3 pgs.

Torabi, M., et al., "Space-Time-Frequency COFDM with Power Allocation for Broadband Wireless Communications", IEEE Vehicular Technology Conference, Electrical & Computer Deptt., (Sep. 24, 2002), 209-213.

International Preliminary Report on Patentability received on PCT Patent Application No. PCT/US2004/025509, mailed on Feb. 23, 2006, 9 pages.

Torabi et al., "Performance Evaluation of Space-Frequency Coded OFDM Systems Over Frequency Selective Fading Channels", Canadian Conference on Electrical and Computer Engineering, May 4, 2003, pp. 1699-1702.

Rende et al., "Bit Interleaved Space-Frequency Coded Modulation for OFDM Systems", IEEE International Conference on Communcations, May 11, 2003, pp. 2827-2831.

Bangerter, Boyd, "High-Throughput Wireless LAN Air Interface", Intel Technology Journal: Wireless Technologies, vol. 7, Issue 3, mailed on Aug. 19, 2003, pp. 47-57, webpage available at:http://developer.intel.com/technology/itj/index.htm.

Office Action received for U.S. Appl. No. 10/750,587, mailed on Nov. 19, 2007, 15 pages.

Response to office Action for U.S. Appl. No. 10/750,587, filed Feb. 8, 2008, 15 pages.

Preliminary Amendment for the U.S. Appl. No. 10/750,587, filed Aug. 6, 2004, 3 pages.

Notice of Allowance received for U.S. Appl. No. 10/750,587, mailed on Mar. 17, 2008, 11 pages.

Torabi et al., "Space-Time-Frequency COFDM with Power Allocation for Broadband Wireless Communications", IEEE Vehicular Technology Conference, Electrical & Computer Deptt., Sep. 24, 2002, pp. 209-213.

Rende et al., "Bit Interleaved Space-frequency Coded Modulation for OFDM Systems", IEEE International Conference on Communication, vol. 1 of 5, Wireless Information and Networking Group, ICC 2003, May 15, 2003, pp. 2827-2831.

International Search Report received for PCT Patent Application No. PCT/US2004/025509, mailed on Mar. 29, 2005, 3 pages.

Torabi et al., "Performance Evaluation of Space-Frequency Coded OFDM Systems Over Frequency Selective Fading Channels", Canadian Conference on Electrical and Computer Engineering, May 7, 2003, pp. 1699-1702.

Office Action received for Japanese Patent Application No. 2006-523250, mailed on Aug. 16, 2008, 12 pages.

Office Action received for Japanese Patent Application No. 2006-523250, mailed on Mar. 30, 2009, 4 pages.

Guillaud et al., "Multi-Stream Coding for MIMO OFDM Systems with Space-Time-Frequency Spreading", International Symposium on Wireless Personal Multimedia Communications, Oct. 27, 2002, pp. 120-124.

Office Action received for Chinese Patent Application No. 200480029297.9, mailed on Oct. 30, 2009, 8 pages.

Notice of Allowance received for U.S. Appl. No. 12/482,671, mailed on Jun. 17, 2010, 7 pages.

Ex Parte Quayle office action received for U.S. Appl. No. 12/482,671, mailed on Mar. 26, 2010, 5 pages.

Supplemental Notice of Allowability received for U.S. Appl. No. 12/118,838, mailed on Feb. 18, 2010, 3 pages.

Notice of Allowance received for U.S. Appl. No. 12/118,838, mailed on Jan. 28, 2010, 7 pages.

Office Action mailed received for Chinese Patent Application No. 200480029297.9, mailed on Feb. 27, 2009, 22 pages.

* cited by examiner

RECEIVER

MIMO TRANSMITTER FOR TRANSMITTING A GROUP OF SEQUENTIAL OFDM SYMBOLS USING A PLURALITY OF ANTENNAS

CROSS REFERENCE TO RELATED APPLICATIONS

This application is a continuation of U.S. patent application Ser. No. 12/118,838, filed on May 12, 2008, now issued as U.S. Pat. No. 7,738,579, which is a continuation of U.S. patent application Ser. No. 10/750,587, filed on Dec. 29, 2003, now issued as U.S. Pat. No. 7,394,858, which claims the benefit of U.S. Provisional Patent Application Ser. No. 60/493,937, filed on Aug. 8, 2003, all of which are incorporated herein by reference in their entireties.

TECHNICAL FIELD

Embodiments of the present invention pertain to wireless communications. In some embodiments, the present invention pertains to orthogonal frequency division multiplexed communications, and in some embodiments, the present invention pertains to wireless local area networks.

BACKGROUND

The data rate of many conventional orthogonal frequency division multiplexed (OFDM) systems is limited by a maximum modulation order (e.g., bits per symbol) that may be effectively communicated on the symbol-modulated subcarriers of an OFDM channel. Thus, there are general needs for apparatus and methods for communicating additional data without an increase in frequency bandwidth.

BRIEF DESCRIPTION OF THE DRAWINGS

The appended claims are directed to some of the various embodiments of the present invention. However, the detailed description presents a more complete understanding of embodiments of the present invention when considered in connection with the figures, wherein like reference numbers refer to similar items throughout the figures and:

DETAILED DESCRIPTION

The following description and the drawings illustrate specific embodiments of the invention sufficiently to enable those skilled in the art to practice them. Other embodiments may incorporate structural, logical, electrical, process, and other changes. Examples merely typify possible variations. Individual components and functions are optional unless explicitly required, and the sequence of operations may vary. Portions and features of some embodiments may be included in or substituted for those of others. The scope of embodiments of the invention encompasses the full ambit of the claims and all available equivalents of those claims. Such embodiments of the invention may be referred to, individually or collectively, herein by the term "invention" merely for convenience and without intending to voluntarily limit the scope of this application to any single invention or inventive concept if more than one is in fact disclosed.

Figure 1:
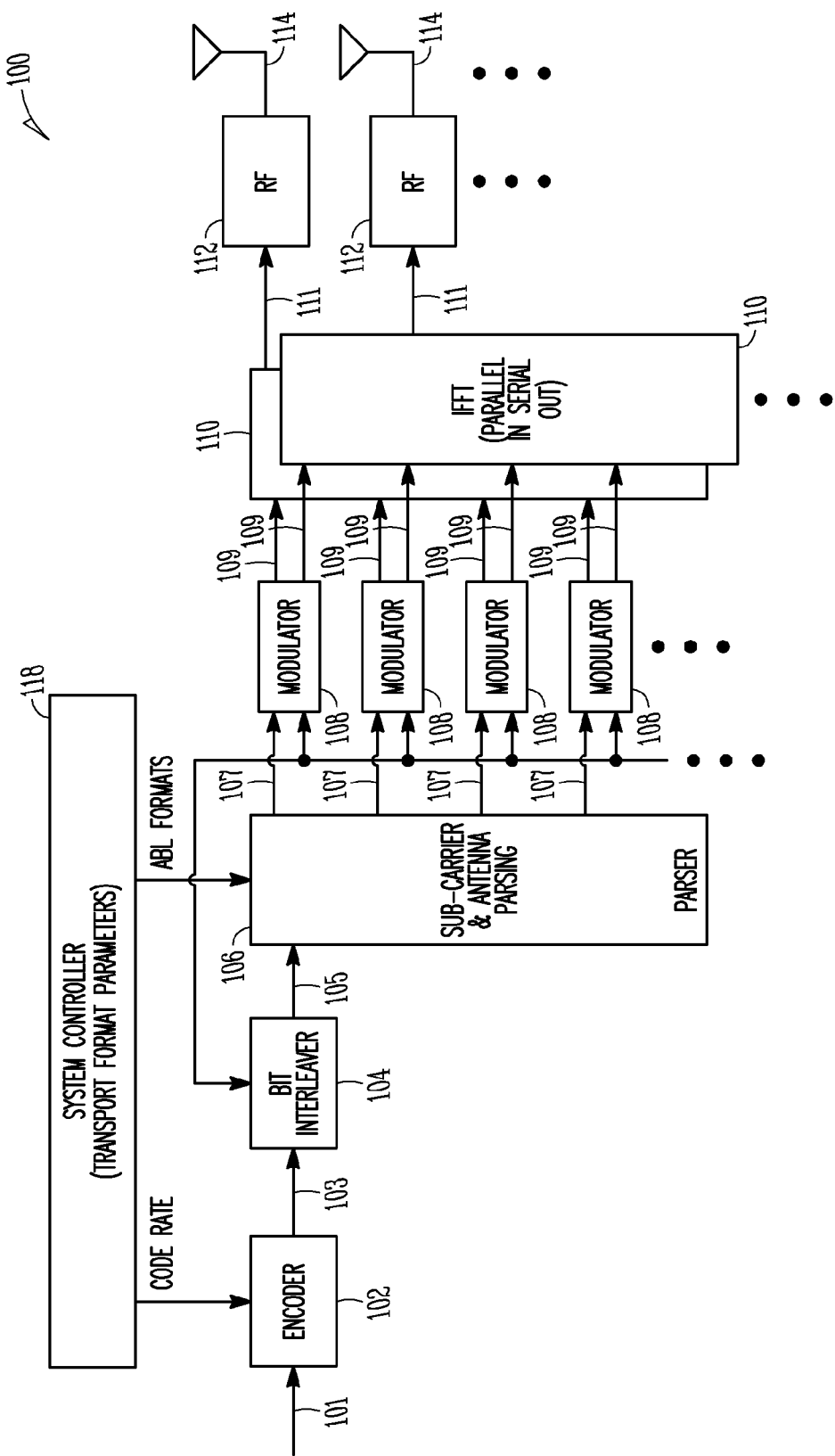
FIG. 1 is a block diagram of a transmitter in accordance with some embodiments of the present invention.

FIG. 1 is a block diagram of a transmitter in accordance with some embodiments of the present invention. Transmitter 100 may be part of a wireless communication device, and may transmit orthogonal frequency division multiplexed (e.g., OFDM) communication signals. Transmitter 100 may transmit an OFDM symbol on a communication channel within a predetermined frequency spectrum. The channels may comprise a plurality of orthogonal subcarriers. In some embodiments, the orthogonal subcarriers of a channel may be closely spaced OFDM subcarriers. To achieve orthogonality between the closely spaced subcarriers, the subcarriers of a particular channel may have null at substantially a center frequency of the other subcarriers of that channel.

In some embodiments, transmitter 100 may utilize more than one of spatially-diverse antennas 114 to "divide" the channel into one or more spatial channels. In some embodiments, each transmit antenna 114 may define one spatial channel. In other embodiments, beamforming may be used to "divide" the channel into spatial channels. In these embodiments, each spatial channel may be used to communicate separate or independent data streams on the same subcarriers as the other spatial channels, allowing the communication of additional data without an increase in frequency bandwidth. The use of spatial channels may take advantage of the multipath characteristics of the channel. In some embodiments, the spatial channels may be non-orthogonal channels, although the scope of the invention is not limited in this respect.

In accordance with some embodiments, transmitter 100 may individually symbol-modulate the subcarriers of each spatial channel in accordance with individual subcarrier modulation assignments. This may be referred to as adaptive bit loading (ABL). Accordingly, one or more bits may be represented by a symbol-modulated on a subcarrier. The modulation assignments for each spatial channel may be based on the channel characteristics or channel conditions for that spatial channel, although the scope of the invention is not limited in this respect. In some embodiments, these spatial-frequency subcarrier modulation assignments may range from zero bits per symbol to up to ten or more bits per symbol. In terms of modulation levels, the spatial-frequency subcarrier modulation assignments may comprise binary phase shift keying (BPSK), which communicates one bit per symbol, quadrature phase shift keying (QPSK), which communicates two bits per symbol, 8PSK, which communicates three bits per symbol, 16-quadrature amplitude modulation (16-QAM), which communicates four bits per symbol, 32-QAM, which communicates five bits per symbol, 64-QAM, which communicates six bits per symbol, 128-QAM, which communicates seven bits per symbol, and 256-QAM, which communicates eight bits per symbol. Subcarrier modulation assignments with higher data communication rates per subcarrier (e.g., ten bits) may also be used.

An OFDM symbol may be viewed as the combination of the symbols modulated on the individual subcarriers of all the spatial channels. Because of the variable number of bits per symbol-modulated subcarrier and the variable number of spatial channels that may be used, the number of bits per OFDM symbol may vary greatly. For example, when four transmit antennas are used to provide four spatial channels, when each spatial channel uses up to 48 OFDM data subcarriers, and when each subcarrier has a spatial-frequency subcarrier modulation assignment ranging between zero and six bits per symbol, the number of bits per OFDM symbol may range up to 1152 bits (4 spatial channels×48 data subcarriers per spatial channel×6 bits per symbol), depending on the channel conditions of the spatial channels, among other things.

In accordance with some embodiments, data for transmission over the spatial channels is provided to transmitter 100 in the form of bit stream 101. Encoder 102 may apply forward error correcting (FEC) codes to bit stream 101 to generate coded bits comprising bit stream 103. Bit interleaver 104 may perform an interleaving operation on a block of bits to generate interleaved block of bits 105. Block of bits 105 may represent an OFDM symbol. Parser 106 may parse block of bits 105 into groups of bits 107 having a variable number of coded bits. The variable number of coded bits of a group may be determined by the spatial-frequency subcarrier modulation assignments associated with a particular subcarrier of a particular spatial channel. Subcarrier modulators 108 may individually modulate the groups of bits 107 on corresponding OFDM subcarriers for each spatial channel in accordance with the spatial-frequency subcarrier modulation assignments to generate symbol-modulated subcarriers 109. In some embodiments, parser 106 may include a serial-to-parallel conversion to provide the groups of bits in a parallel form to subcarrier modulators 108.

In some embodiments, symbol-modulated subcarriers 109 may comprise a symbol-modulated subcarrier for each subcarrier of a spatial channel. An OFDM symbol may be represented by the combination of all symbol-modulated subcarriers 109. In some of these embodiments, a plurality of individual subcarrier modulators 108 (e.g., one for each subcarrier) may each separately modulate an individual OFDM subcarrier. In these embodiments, each one of subcarrier modulators 108 may modulate symbols for the same frequency subcarrier of the different spatial channels.

Inverse Fast Fourier transform (IFFT) circuitry 110 may perform IFFTs on symbol-modulated subcarriers 109 to generate time domain representations of the OFDM symbol. Almost any form of inverse discrete Fourier transform (IDFT) may be used to perform the inverse transform operation. The number of time domain samples generated by IFFT circuitry 110 may be equal to the number of frequency components input thereto. In some embodiments, IFFT circuitry 110 may generate a time domain waveform for each spatial channel from the combination of symbol-modulated subcarriers 109 for that spatial channel.

IFFT circuitry 110 may also convert the time domain samples generated by the IFFT operation, which may be in a parallel form, to one or more serial symbol streams 111. IFFT circuitry 110 may also add a cyclic extension (or guard interval) to reduce inter-symbol interference in the channel. In some embodiments, the number of serial symbol streams 111 generated by IFFT circuitry may correspond to the number of spatial channels, although the scope of the invention is not limited in this respect. Radio frequency (RF) circuitry 112 may prepare each of serial symbol streams 111 for RF transmission over a corresponding one of the spatial channels.

In some embodiments, each of spatially diverse antennas 114 may be associated with a spatial channel and may receive RF signals from an associated one of RF circuitry 112. Spatially diverse antennas 114 may be separated by a distance. A minimum separation distance may be based on the wavelength of the frequency spectrum used for communicating. In some embodiments, a separation of a few centimeters may be sufficient to help assure multipath differences between the spatial channels. Antennas 114 may comprise one or more directional or omnidirectional antennas, including, for example, dipole antennas, monopole antennas, loop antennas, microstrip antennas or other types of antennas suitable for transmission of RF signals by transmitter 100.

In some embodiments, the spatial-frequency subcarrier modulation assignments may be based on channel conditions, such as a signal to interference and noise ratio (SINR) for the particular subcarrier in a particular spatial channel. In some embodiments, the spatial-frequency subcarrier modulation assignments may be determined and provided by a receiving station, although the scope of the invention is not limited in this respect. In some embodiments, higher subcarrier modulation assignments (e.g., more bits per symbol) may be used for subcarriers having better SINRs.

In some embodiments, bit interleaver 104 may input a variable number of coded bits of bit stream 103 into an interleaver matrix of interleaver 104. In some embodiments, the variable number of coded bits may comprise one OFDM symbol and may comprise the number of coded bits per OFDM symbol (Ncbps). In some embodiments, system controller 118 may calculate the variable number of coded bits per OFDM symbol based on the spatial-frequency subcarrier modulation assignments for the subcarriers for each spatial channel. In some embodiments, the number of coded bits per OFDM symbol (Ncbps) may be provided by system controller 118 to bit interleaver 104.

In some embodiments, system controller 118 may generate and provide transport format parameters to one or more other elements of transmitter 100 as illustrated. The transport format parameters may include the spatial-frequency subcarrier modulation assignments as well as the number of coded bits per OFDM symbol. The transport format parameters may also include other information to specify how the OFDM symbol is to be modulated. In some embodiments, the transport format parameters may include, in addition to the number of coded bits per OFDM symbol, the number of bits to be modulated on each spatial stream. In some embodiments, interleaver 104 may also be provided the subcarrier modulation assignments, although the scope of the invention is not limited in this respect.

In some embodiments, parser 106 may parse a block of bits representing an OFDM symbol into groups having a variable number of coded bits, and subcarrier modulators 108 may individually modulate the groups of bits on OFDM subcarriers in accordance with the spatial-frequency subcarrier modulation assignments to generate symbol-modulated subcarriers 109. IFFT circuitry 110 may generate time domain waveforms from the symbol-modulated subcarriers for subsequent RF transmission over the spatial channels. In these embodiments, the number of groups of bits may be equal to a number of spatial channels multiplied by a number of the OFDM subcarriers of the channel.

In some embodiments, transmitter 100 may include an RF chain for each spatial channel. The RF chain may comprise one of RF circuitry 112 and an associated one of IFFT circuitry 110 for each spatial channel. Although one of antennas 114 is illustrated for each RF chain, this is not a requirement. Modulators 108, on the other hand, may be associated with particular subcarriers rather than spatial channels so that any one modulator may modulate corresponding subcarriers (i.e., of the same subcarrier frequency) of each of the spatial channels. For each subcarrier, multiple symbols may be processed by one of modulators 108.

In some embodiments, where there are N OFDM subcarriers and M spatial channels, parser 106 may provide N×M groups of bits. In some embodiments, N and M may be positive integers less than 100. In some example embodiments in which there are forty-eight data subcarriers and ten spatial channels, there may be up to 480 groups of bits. Each group of bits, for example, may have up to six bits each when a maximum modulation of 64 QAM is used, although the scope of the present invention is not limited in this respect.

In some embodiments, parser 106 may be a spatial-frequency parser to parse a block of bits of a variable size into spatial-frequency groups of bits. Each spatial-frequency group may be associated with a spatial channel and a subcarrier frequency of the associated spatial channel.

In some embodiments, the functions of interleaver 104 and parser 106 may be performed in a different order than described above. For example, the parsing may be performed before interleaving, although the scope of the invention is not limited in this respect. In these embodiments, a symbol interleaver may be used after parsing. In some embodiments, interleaving may be performed separately for each spatial channel, although the scope of the invention is not limited in this respect. In some embodiments, encoder 102 may use a code, such as a low-density parity check code (LDPC) that does not always require an interleaving operation.

In some embodiments, transmitter 100 may comprise a spatial-frequency interleaver. In these embodiments, the functions of interleaver 104 and parser 106 may be combined into the spatial-frequency interleaver. In these embodiments, interleaving may be performed before, during or after parsing, and may be performed on any groups of bits to help assure that adjacent bits are separated by at least two subcarriers.

In some embodiments, transmitter 100 may transmit an OFDM symbol on a wideband communication channel. The wideband channel may comprise one or more subchannels. The subchannels may be frequency-division multiplexed (i.e., separated in frequency) and may be within a predetermined frequency spectrum. The subchannels may include more than one spatial channel and the spatial channels of a particular subchannel may use the same set of orthogonal subcarriers. In some embodiments, a wideband channel may comprise up to four or more subchannels, and each subchannel may have up to forty-eight or more orthogonal data subcarriers. Each subchannel may have a number of spatial channels determined by the number of RF chains. In some of these embodiments, the subchannels may have bandwidths of approximately 20 MHz, and each OFDM subcarrier of each spatial channel of a subchannel may be assigned an individual spatial-frequency subcarrier modulation assignment between zero and ten or more bits per symbol. In these embodiments, transmitter 100 may transmit the OFDM symbol over the spatial channels of the subchannels that comprise the wideband channel. Subchannels with greater or lesser bandwidths may also be suitable.

In some embodiments, the frequency spectrums for a channel may comprise either a 5 GHz frequency spectrum or a 2.4 GHz frequency spectrum. In these embodiments, the 5 GHz frequency spectrum may include frequencies ranging from approximately 4.9 to 5.9 GHz, and the 2.4 GHz spectrum may include frequencies ranging from approximately 2.3 to 2.5 GHz, although the scope of the invention is not limited in this respect, as other frequency spectrums are also equally suitable.

Figure 2:
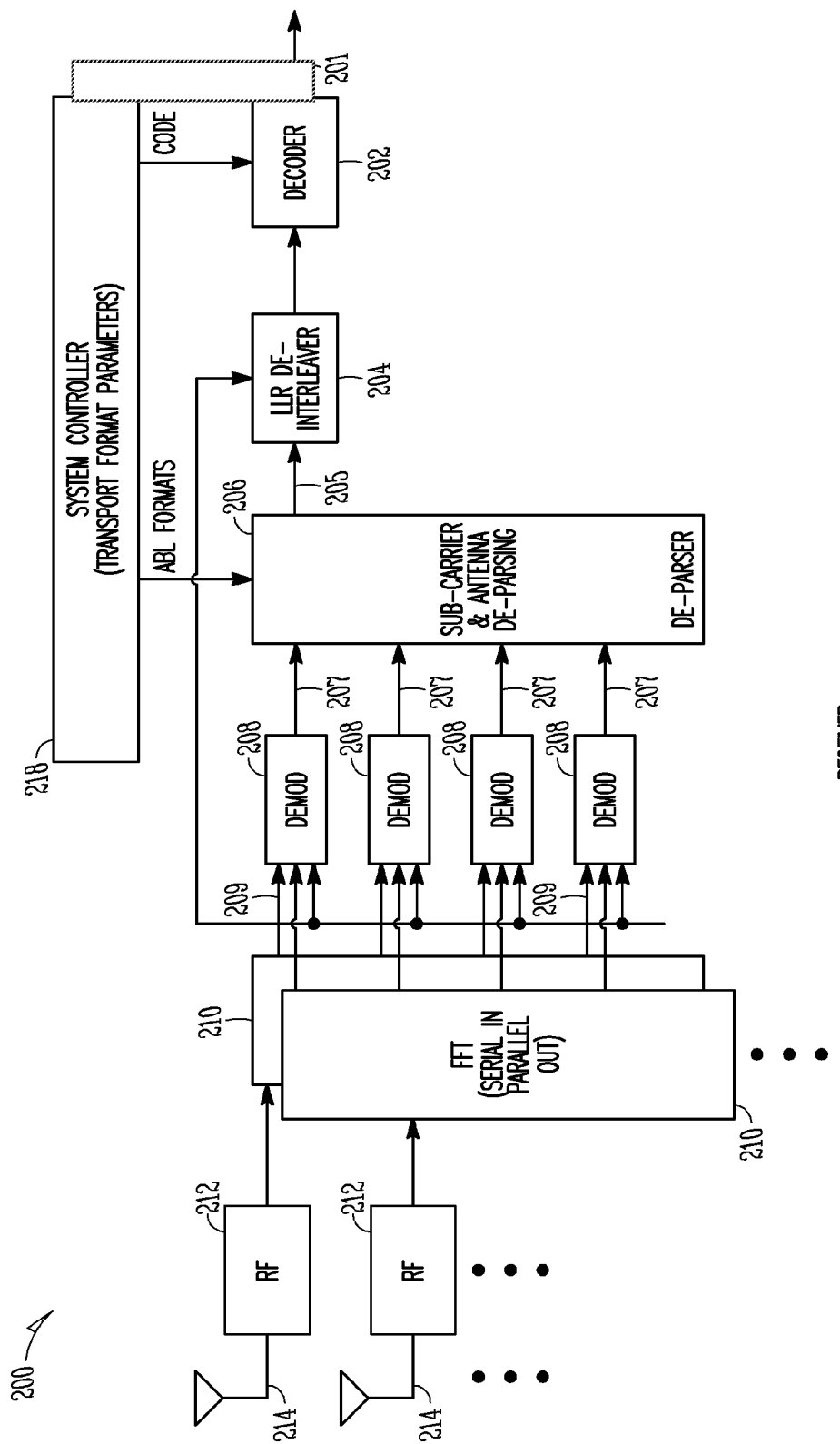
FIG. 2 is a block diagram of a receiver in accordance with some embodiments of the present invention.

FIG. 2 is a block diagram of a receiver in accordance with some embodiments of the present invention. Receiver 200 may be part of a wireless communication device and may receive OFDM communication signals over an OFDM channel having more than one spatial channel.

The OFDM signals may have been transmitted in accordance with ABL scheme which employs an individual spatial-frequency subcarrier modulation assignment for each subcarrier of each spatial channel. Transmitter 100 (FIG. 1) is an example of a transmitter that may transmit suitable OFDM symbols, although other transmitters may also be suitable.

Receiver 200 may comprise one or more of spatially diverse antennas 214 and RF circuitry 212 to receive an OFDM symbol over a plurality of spatial channels. Receiver 200 may also comprise fast Fourier transform (FFT) circuitry 210 to generate frequency domain representations 209 of the OFDM symbol received over the OFDM subcarriers. Receiver 200 may also comprise subcarrier demodulators 208 to demodulate frequency domain representations 209 for each subcarrier from each of the spatial channels in accordance with the spatial-frequency subcarrier modulation assignments to generate groups of bits 207. Receiver 200 may also comprise deparser 206 to combine groups of bits 207 to generate blocks of coded bits 205 representing the OFDM symbol. Deinterleaver 204 may perform a deinterleaving operation on block of coded bits 205 and decoder 202 may decode the blocks of bits to generate decoded bit sequence 201.

In some embodiments, receiver 200 may include an RF chain for each spatial channel. The RF chain may comprise one of RF circuitry 212 and an associated one of FFT circuitry 210 for each spatial channel. In some embodiments, antennas 214 may be spatially diverse antennas and each may be associated with a spatial channel. Although one of antennas 214 is illustrated for each RF chain, this is not a requirement. Demodulators 208, on the other hand, may be associated with particular subcarriers rather than spatial channels so that any one demodulator may demodulate corresponding subcarriers (of the same subcarrier frequency) of each of the spatial channels. For each subcarrier, multiple symbols may be processed by one of demodulators 208.

Demodulators 208 may be implemented in various ways. In some embodiments, demodulators 208 may be implemented with a minimum mean square error (MMSE) receiver. In other embodiments, demodulators 208 may be implemented with a successive interference cancellation algorithm. In yet other embodiments, demodulators 208 may be implemented with or with maximum likelihood (ML) demodulators, or soft-output ML-like demodulators (such as difference-min-difference demodulation) with either full or reduced search space algorithms such as sphere decoding. In some embodiments, demodulators 208 may deliver soft bit level log-likelihood ratios (LLRs) that may be subsequently de-interleaved and delivered to decoder 202, although the scope of the present invention is not limited in these respects.

In some embodiments, receiver 200 may provide spatial-frequency subcarrier modulation assignments to a transmitting station for use in transmitting OFDM symbols to receiver 200. In these embodiments, receiver 200 may further comprise a subcarrier modulation assignment generator to determine the spatial-frequency subcarrier modulation assignments based on channel characteristics for each of the orthogonal frequency division multiplexed subcarriers associated with the spatial channels. The channel characteristics may comprise a signal to noise and interference ratio (SINR) measured by receiver 200 from the spatial channels, although the scope of the present invention is not limited in this respect.

In some embodiments, a receiving station, such as receiver 200, may measure a multiple-input, multiple-output (MIMO) channel for each subcarrier. The MIMO channel may comprise a plurality of spatially diverse paths. The receiving station may use these measurements to calculate a spatial subchannel SINR for each subcarrier. In these embodiments, the receiving station may use a matrix channel comprising a channel term for each transmit-receive antenna pair and may use the matrix to calculate a SINR for each subcarrier, although the scope of the present invention is not limited in this respect.

In some embodiments, transmitter 100 (FIG. 1) and/or receiver 200 may transmit and/or receive RF signals in accordance with specific communication standards, such as the IEEE 802.11(a), 802.11(b), 802.11(g/h) and/or 802.16 standards for wireless local area network (WLAN) communications, although transmitter 100 and/or receiver 200 may also be suitable to transmit and/or receive communications in accordance with other techniques. In some embodiments, the RF signals may comprise OFDM signals comprising a plurality of symbol-modulated subcarriers in either a 5 GHz frequency spectrum or 2.4 GHz frequency spectrum.

In some embodiments, transmitter 100 (FIG. 1) and/or receiver 200 may be part of a wireless communication device. The wireless communication device may be a personal digital assistant (PDA), a laptop or portable computer with wireless communication capability, a web tablet, a wireless telephone, a wireless headset, a pager, an instant messaging device, an MP3 player, a digital camera, an access point or other device that may receive and/or transmit information wirelessly.

Although transmitter 100 (FIG. 1) and receiver 200 are illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, application specific integrated circuits (ASICs), and combinations of various hardware and logic circuitry for performing at least the functions described herein.

When transmitter 100 (FIG. 1) and receiver 200 (FIG. 2) comprise a wireless communication device, there is no requirement that the number of spatially diverse antennas used for transmission be equal to the number of spatially diverse antennas used for reception. In some embodiments, one set of spatially diverse antennas may be used by the wireless communication device for both reception and transmission. However, in accordance with some embodiments, transmitter 100 (FIG. 1) may include an RF chain for each spatial channel used to transmit, and receiver 200 (FIG. 2) may include an RF chain for each spatial channel used to receive. In some embodiments, receiver 200 may include beamforming circuitry to receive spatial channels through a single receive antenna, or through more than one receive antennas that do not necessarily correspond to the number of spatial channels.

Figure 3:
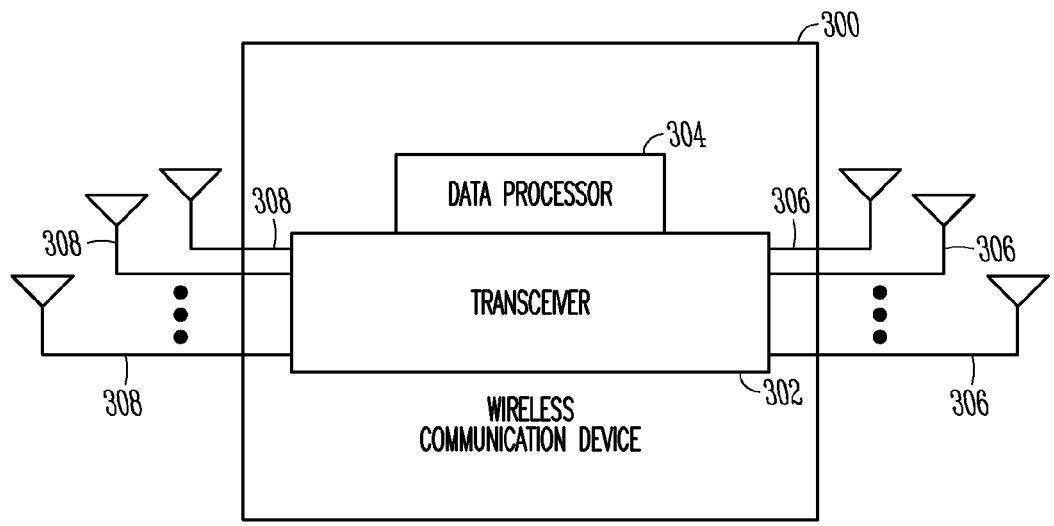
FIG. 3 is a block diagram of a wireless communication device in accordance with some embodiments of the present invention.

FIG. 3 is a block diagram of a wireless communication device in accordance with some embodiments of the present invention. Wireless communication device 300 may comprise transceiver 302, data processor 304, spatially diverse transmit antennas 306 and spatially diverse receive antennas 308. Data processor 304 may generate a bit stream, such as bit stream 101 (FIG. 1), for transmission by a transmitter portion of transceiver 202. Data processor 304 may also receive a decoded bit stream, such as bit stream 201 (FIG. 2), from a receiver portion of transceiver 302.

Wireless communication device 300 may operate in an OFDM system and may employ multiple antennas 306 and 308 to communicate separate data streams on spatial channels. In some embodiments, each spatial channel may use the same set of OFDM subcarriers (for receiving and/or transmitting) and may take advantage of the differing multipath characteristics of the spatial channels allowing the communication of additional data without an increase in frequency bandwidth. In accordance with some embodiments, spatial-frequency subcarrier modulation assignments may be dynamically assigned on a per subcarrier basis per spatial channel to help maximize the data-carrying capacity of the channel.

In some embodiments, transmitter 100 (FIG. 1) and receiver 200 (FIG. 2) may be suitable for use as transceiver 302, although other transceivers may also be suitable. In some of these embodiments, the transmitter and receiver may share IFFT and FFT circuitry. In some embodiments, transceiver 302 may operate in a time-division duplex mode and employ a single set of spatially diverse antennas for use in both transmitting and receiving, although the scope of the invention is not limited in this respect.

In some embodiments, transceiver 302 may include a transmit antenna beamformer to perform beamforming on the time-domain waveforms for subsequent RF transmission over the spatial channels with a single transmit antenna, or a plurality of transmit antennas, such as one or more of antennas 306. In some embodiments, transceiver 302 may include a receive antenna beamformer to perform beamforming on the time-domain waveforms for subsequent RF transmission over the spatial channels with a single receive antenna, or a plurality of receive antennas, such as one or more of antennas 308. In these embodiments, antennas 308 and antennas 306 are not necessarily associated with spatial channels.

Wireless communication device 300 is illustrated as a MIMO system. In these embodiments, wireless communication device may employ more than one transmit antenna for more than one output data path and more than one receive antenna for more than one input data path. In other embodiments, wireless communication device 300 may use a single one of transmit antennas 306, and more than one spatially diverse receive antennas 308. In other embodiments, wireless communication device 300 may use single one of receive antennas 308, and more than one spatially diverse transmit antennas 306.

In some embodiments, a single transmit antenna may be used to transmit over more than one spatial channel by employing beamforming and/or beam-steering techniques. In these embodiments, the transmitter portion of transceiver 302 may include an RF chain associated with each spatial channel. In some embodiments, a single receive antenna may be used to receive over more than one spatial channel by employing beamforming and/or beam-steering techniques. In these embodiments, the receiver portion of transceiver 302 may also include an RF chain associated with each spatial channel.

In some embodiment, reception and transmission may be performed by the same one or more antennas, suitable diplexing or signal separation circuitry may be used to separate received and transmitted signals.

In some embodiments, when device 300 operates as part of an OFDM communication system, such as part of a WLAN, the transport format may be known at both the transmitting station and the receiving station. In some time-division duplex (TDD) embodiments, due to channel reciprocity, both ends of the link may apply the same transport format parameter selection algorithm for selection of the spatial-frequency subcarrier modulation assignments. However estimation errors may result in a different format being applied at the receiving station than was actually transmitted. In other embodiments, transport format parameters may be negotiated between the transmitting station and the receiving station. In some embodiments, a request-to-send/clear-to-send (RTS/

CTS) signaling structure may be used, although the scope of the invention is not limited in this respect.

Figure 4:
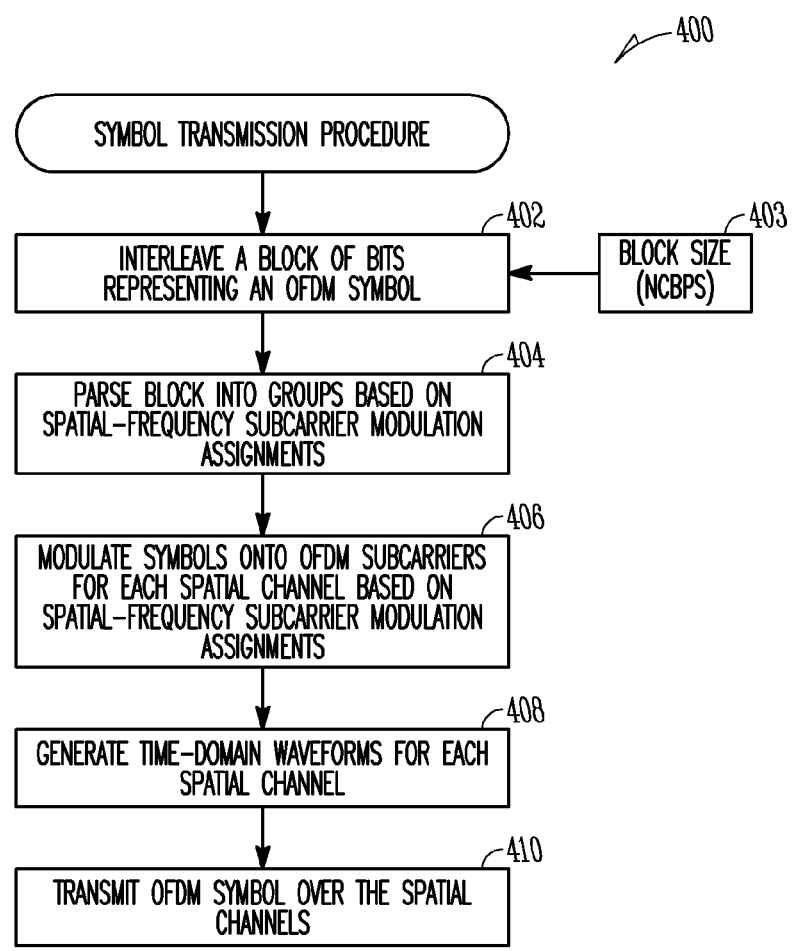
FIG. 4 is a flow chart of an OFDM symbol transmission procedure in accordance with some embodiments of the present invention.

FIG. 4 is a flow chart of an OFDM symbol transmission procedure in accordance with some embodiments of the present invention. OFDM symbol transmission procedure 400 may be performed by a transmitter, such as transmitter 100 (FIG. 1) to generate an OFDM symbol and transmit the OFDM symbol on more than one spatial channel in accordance with spatial-frequency subcarrier modulation assignments, although other transmitters may also be suitable.

In operation 402, a block of coded bits representing an OFDM symbol may be interleaved. The OFDM symbol may comprise a number of coded bits per OFDM symbol (Ncbps) 403 which may be determined by the spatial-frequency subcarrier modulation assignments for each subcarrier for each spatial channel. In some embodiments, the number of spatial-frequency subcarrier modulation assignments may equal the number of subcarriers multiplied by the number of spatial channels. In some embodiments, operation 402 may be performed by bit interleaver 104 (FIG. 1), although the scope of the invention is not limited in this respect.

In operation 404, the bits may be parsed into groups representing symbols. In some embodiments, the parsing of operation 404 may be performed prior to the interleaving of operation 402. In these embodiments, interleaving may be performed on each parsed group of bits, although the scope of the invention is not limited in this respect. The number of bits per individual group may be based on a spatial-frequency subcarrier modulation assignment for each subcarrier for an associated spatial channel. The number of groups may be equal to the number of subcarriers multiplied by the number of spatial channels. In some embodiments, operation 404 may be performed by parser 106 (FIG. 1), although the scope of the invention is not limited in this respect.

In operation 406, the groups of bits representing symbols are modulated onto OFDM subcarriers to generate symbol-modulated carriers for each spatial channel. The modulation may be based on the spatial-frequency subcarrier modulation assignments for each subcarrier for an associated spatial channel. In some embodiments, operation 406 may be performed by subcarrier modulators 108 (FIG. 1), although the scope of the invention is not limited in this respect. Modulators 108 (FIG. 1) may be associated with individual subcarriers.

In operation 408, a time-domain waveform may be generated for each spatial channel. The time domain waveform may be generated from all OFDM subcarriers associated with a spatial channel. In some embodiments, operation 408 may be performed by IFFT circuitry 110 (FIG. 1), although the scope of the invention is not limited in this respect. In these embodiments, a modulator may be provided for each subcarrier, and an IFFT processor may be provided for each spatial channel.

In operation 410, the OFDM symbol comprising the time domain waveforms may be transmitted over the spatial channels Operations 410 may be performed by RF circuitry 112 (FIG. 1) with one or more of antennas 114 (FIG. 1), although the scope of the invention is not limited in this respect. In some embodiments, operations 408 and 410 may comprise generating RF signals with an RF chain associated with each spatial channel. The RF chain, for example, may comprise one of RF circuitry 112 (FIG. 1) and an associated one of IFFT circuitry 110 (FIG. 1) for each spatial channel. In some embodiments, each RF chain may include an antenna for transmitting RF signals associated with a corresponding spatial channel, although the scope of the preset invention is not limited in this respect.

In other embodiments, a single antenna or another number of antennas not necessarily related to the number of spatial channels may be used. In these embodiments, operation 410 may include performing beamforming operations on the outputs of RF circuitry 112 (FIG. 1) to allow the transmission of the RF signals on each spatial channel on a single antenna of other number of antennas.

Figure 5:
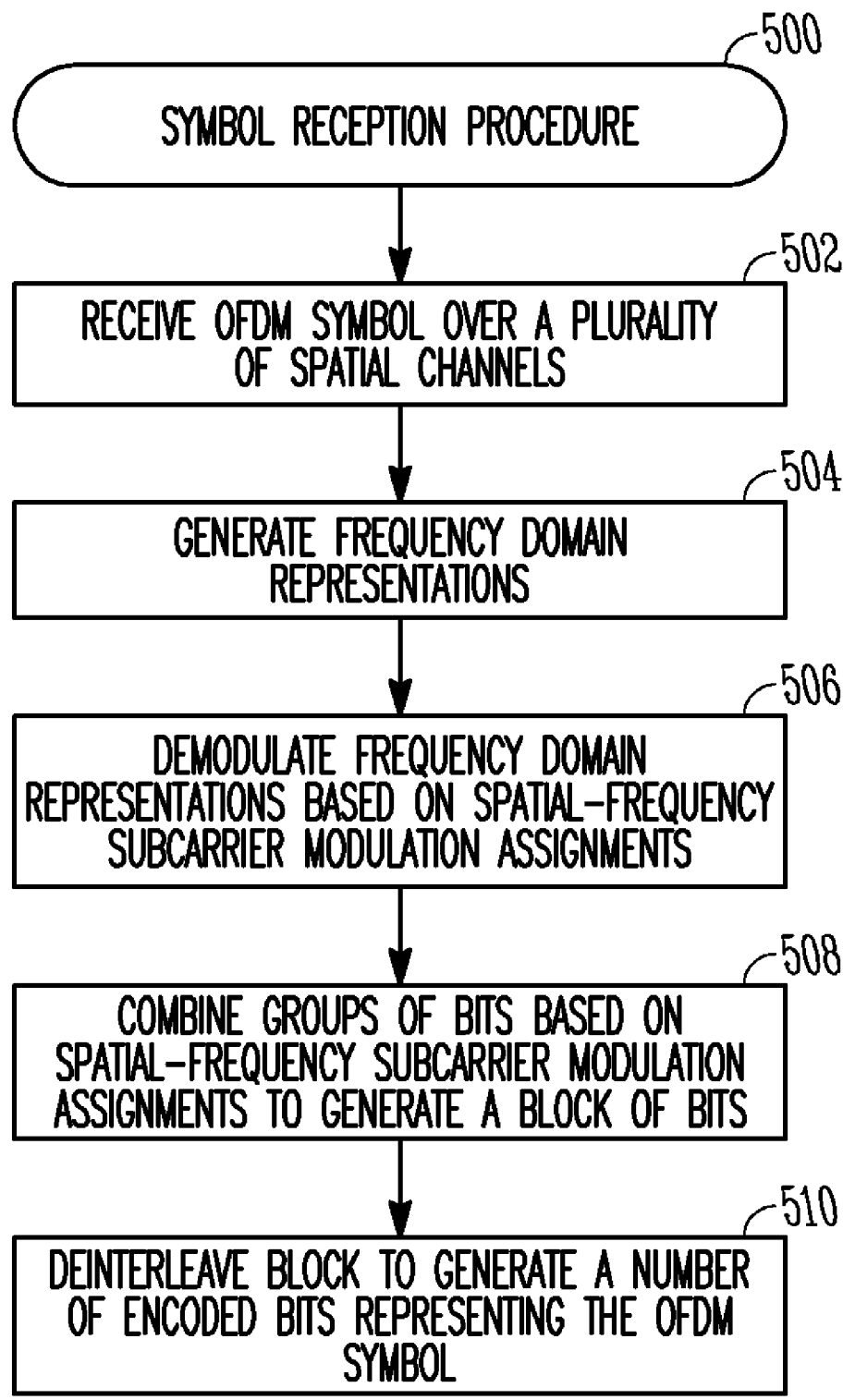
FIG. 5 is a flow chart of an OFDM symbol reception procedure in accordance with some embodiments of the present invention.

FIG. 5 is a flow chart of an OFDM symbol reception procedure in accordance with some embodiments of the present invention. OFDM symbol reception procedure 500 may be performed by a receiver, such as receiver 200 (FIG. 2), to receive an OFDM symbol on more than one spatial channel that has been transmitted in accordance with spatial-frequency subcarrier modulation assignments.

In operation 502, an OFDM symbol may be received over a plurality of spatial channels. In some embodiments, a spatial channel may be associated with a spatially diverse antenna. In other embodiments, the spatial channels may be received using a single antenna or other number of antennas not necessarily related to the number of spatial channels. Operation 502 may include converting received RF signals to serial symbol streams for each spatial channel. In some embodiments, operation 502 may be performed by RF circuitry 212 (FIG. 2), although the scope of the invention is not limited in this respect.

In operation 504, frequency domain representations are generated for each spatial channel. In some embodiments, FFT circuitry 210 (FIG. 2) may perform operation 504, although the scope of the invention is not limited in this respect.

Operation 506 demodulates the frequency domain representations based on a spatial-frequency subcarrier modulation assignment associated with each subcarrier and each spatial channel. Operation 506 may also generate a group of bits from each subcarrier received over each spatial channel based on the spatial-frequency subcarrier modulation assignments. In some embodiments, operation 506 may be performed by demodulators 208 (FIG. 2), although the scope of the invention is not limited in this respect.

In some embodiments, operations 502 and 504 may be performed by an RF chain for each spatial channel. The RF chain may, for example, comprise one of RF circuitry 212 (FIG. 2) and an associated one of FFT circuitry 210 (FIG. 2) for each spatial channel. Although one of antennas 214 (FIG. 2) is illustrated for each RF chain, this is not a requirement. Demodulators 208 (FIG. 2) may perform operation 506 and may be associated with particular subcarriers rather than spatial channels so that a demodulator may demodulate corresponding subcarriers (i.e., of the same subcarrier frequency) of each of the spatial channels.

In some embodiments, each RF chain may include an antenna for receiving RF signals associated with a corresponding spatial channel, although the scope of the preset invention is not limited in this respect. In some other embodiments, a single antenna or another number of antennas not necessarily related to the number of spatial channels may be used. In these other embodiments, operation 502 may include performing beamforming operations on either the inputs to RF circuitry 212 (FIG. 2) to allow the separation of the RF signals for each spatial channel.

Operation 508 may combine the groups of bits in a proper order based on the spatial-frequency subcarrier modulation assignments to generate a block of bits. In some embodiments, operation 508 may be performed by deparser 206 (FIG. 2), although the scope of the invention is not limited in this respect.

Operation 510 may deinterleave the block to generate a number of coded bits representing the OFDM symbol. Operation 510 may be performed by deinterleaver 204 (FIG. 2), although the scope of the invention is not limited in this respect. The block may be subsequently decoded to generate a coded bit stream. In some embodiments, the parsing may be performed before deinterleaving.

Although the individual operations of procedure 400 (FIG. 4) and procedure 500 are illustrated and described as separate operations, one or more of the individual operations may be performed concurrently, and nothing requires that the operations be performed in the order illustrated.

Embodiments of the invention may be implemented in one or a combination of hardware, firmware and software. Embodiments of the invention may also be implemented as instructions stored on a machine-readable medium, which may be read and executed by at least one processor to perform the operations described herein. A machine-readable medium may include any mechanism for storing or transmitting information in a form readable by a machine (e.g., a computer). For example, a machine-readable medium may include read-only memory (ROM), random-access memory (RAM), magnetic disk storage media, optical storage media, flash-memory devices, electrical, optical, acoustical or other form of propagated signals (e.g., carrier waves, infrared signals, digital signals, etc.), and others.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims.

In the foregoing detailed description, various features are occasionally grouped together in a single embodiment for the purpose of streamlining the disclosure. This method of disclosure is not to be interpreted as reflecting an intention that the claimed embodiments of the subject matter require more features than are expressly recited in each claim. Rather, as the following claims reflect, invention lies in less than all features of a single disclosed embodiment. Thus the following claims are hereby incorporated into the detailed description, with each claim standing on its own as a separate preferred embodiment.

We claim:

1. A multiple-input-multiple output (MIMO;) transmitter for transmitting a group of sequential orthogonal frequency division multiplexed (OFDM) symbols on a channel using a plurality of antennas comprising:
   subcarrier modulators to individually modulate groups of OFDM subcarriers in accordance with spatial-frequency subcarrier modulation assignments to generate groups of symbol-modulated subcarriers;
   logic to combine corresponding symbol-modulated subcarriers for transmission on each of a plurality of spatial channels, the spatial channels being non-orthogonal and having different multipath characteristics; and
   a beamformer to perform beamforming on the combined symbol-modulated subcarriers for transmission over the spatial channels,
   wherein the channel comprises a plurality of the groups of the OFDM subcarriers,
   wherein the OFDM subcarriers within each group of subcarriers and within each group of sequential OFDM symbols have the same spatial-frequency subcarrier modulation assignments, and
   wherein the spatial-frequency subcarrier modulation assignments for each group are determined based on feedback by a receiver, the feedback determined from spatial channel characteristics of the spatial channels.

2. The MIMO transmitter of claim 1 further comprising a spatial-frequency parser to parse a block of bits into spatial-frequency groups of a variable number of coded bits, each spatial frequency group being associated with a spatial component and a frequency component of the OFDM symbols, the spatial component being associated with one of the spatial channels, the frequency component being associated with one group of the OFDM subcarriers.

3. A multiple-input-multiple output (MIMO) receiver for receiving a group of sequential orthogonal frequency division multiplexed (OFDM) symbols, the receiver comprising:
   a beamformer to perform beamforming on signals received through a single antenna that were transmitted by a MIMO transmitter over a plurality of spatial channels, the beamformer to help separate signals of the spatial channels, the spatial channels being non-orthogonal and having different multipath characteristics;
   logic to determine spatial-frequency subcarrier modulation assignments for groups of OFDM subcarriers from channel characteristics of the spatial channels and provided feedback indicative of the assignments for transmission to the MIMO transmitter; and
   subcarrier demodulators to demodulate received OFDM subcarriers that comprise the OFDM symbol based on the spatial-frequency subcarrier modulation assignments for the groups of OFDM subcarriers, wherein the same spatial-frequency subcarrier modulation assignments are selected for each subcarrier within the groups of OFDM subcarriers, and wherein the MIMO transmitter is configured to transmit a group of sequential OFDM symbols on a channel with each subcarrier of the group having the same spatial-frequency subcarrier modulation assignment.

4. The MIMO receiver of claim 3 wherein the beamformer performs beamforming on signals that are received through each of a plurality of single antennas, the signals having been transmitted by the MIMO transmitter over the plurality of spatial channels.

5. The MIMO receiver of claim 3 wherein the channel is a time-division multiplexed (TDM) downlink channel in which frames comprising the groups of symbols are time-division multiplexed.

6. The MIMO transmitter of claim 1 wherein the channel is a time-division multiplexed (TDM) downlink channel in which frames comprising the groups of symbols are time-division multiplexed.

7. A MIMO transmitter to transmit a group of sequential orthogonal frequency division multiplexed (OFDM) symbols on a channel using a plurality of antennas, the MIMO transmitter configured to:
   individually modulate groups of OFDM subcarriers in accordance with spatial-frequency subcarrier modulation assignments to generate groups of symbol-modulated subcarriers;
   combine corresponding symbol-modulated subcarriers for transmission on each of a plurality of spatial channels; and
   perform beamforming on the combined symbol-modulated subcarriers for transmission over the spatial channels,
   wherein the channel comprises a plurality of the groups of the OFDM subcarriers,
   wherein the OFDM subcarriers within each group of subcarriers and within each group of sequential OFDM symbols have the same spatial-frequency subcarrier modulation assignments, and wherein the spatial-frequency subcarrier modulation assignments for each group are determined based on feedback by a receiver, the feedback determined from spatial channel characteristics of the spatial channels.

8. The MIMO transmitter of claim 7 wherein the spatial channels are non-orthogonal and have different multipath characteristics, and wherein the channel is a downlink channel in which frames comprising the groups of symbols are time-division multiplexed on the downlink channel.

9. A method for transmitting a group of sequential orthogonal frequency division multiplexed (OFDM) symbols on a channel using a plurality of antennas, the method comprising:

individually modulating groups of OFDM subcarriers in accordance with spatial-frequency subcarrier modulation assignments to generate groups of symbol-modulated subcarriers;

combining corresponding symbol-modulated subcarriers for transmission on each of a plurality of spatial channels; and performing beamforming on the combined symbol-modulated subcarriers for transmission over the spatial channels, wherein the channel comprises a plurality of the groups of the OFDM subcarriers, wherein the OFDM subcarriers within each group of subcarriers and within each group of sequential OFDM symbols have the same spatial-frequency subcarrier modulation assignments, and wherein the spatial-frequency subcarrier modulation assignments for each group are determined based on feedback by a receiver, the feedback determined from spatial channel characteristics of the spatial channels.

10. The method of claim 9 wherein the spatial channels are non-orthogonal and have different multipath characteristics, and wherein the channel is a downlink channel in which frames comprising the groups of symbols are time-division multiplexed on the downlink channel.

* * * * *

UNITED STATES PATENT AND TRADEMARK OFFICE
CERTIFICATE OF CORRECTION

PATENT NO. : 8,396,147 B2
APPLICATION NO. : 12/757117
DATED : March 12, 2013
INVENTOR(S) : Sadowsky et al.

It is certified that error appears in the above-identified patent and that said Letters Patent is hereby corrected as shown below:

On the Title page, in column 2, Item [56] under "Other Publications", line 1, before "U.S.", insert --"--, therefor On the Title page, in column 2, Item [56] under "Other Publications", line 2, after "2009", insert --"--, therefor On Title page 2, in column 1, Item [56] under "Other Publications", line 1, before "U.S.", insert --"--, therefor On Title page 2, in column 1, Item [56] under "Other Publications", line 2, after "2009", insert --"--, therefor On Title page 2, in column 1, Item [56] under "Other Publications", line 3, before "U.S.", insert --"--, therefor On Title page 2, in column 1, Item [56] under "Other Publications", line 4, after "2009", insert --"--, therefor On Title page 2, in column 1, Item [56] under "Other Publications", line 5, before "U.S.", insert --"--, therefor On Title page 2, in column 1, Item [56] under "Other Publications", line 6, delete "Mailed" and insert --mailed--, therefor On Title page 2, in column 1, Item [56] under "Other Publications", line 6, after "2010", insert --"--, therefor On Title page 2, in column 1, Item [56] under "Other Publications", line 7, before "U.S.", insert --"--, therefor Signed and Sealed this
Twenty-eighth Day of January, 2014

Michelle K. Lee
*Deputy Director of the United States Patent and Trademark Office*

CERTIFICATE OF CORRECTION (continued)
U.S. Pat. No. 8,396,147 B2

On Title page 2, in column 1, Item [56] under "Other Publications", line 7, after "12/482,671", insert --,--, therefor On Title page 2, in column 1, Item [56] under "Other Publications", line 8, delete "Mailed" and insert --mailed--, therefor On Title page 2, in column 1, Item [56] under "Other Publications", line 8, after "2010", insert --"--, therefor On Title page 2, in column 1, Item [56] under "Other Publications", line 9, before "U.S.", insert --"--, therefor On Title page 2, in column 1, Item [56] under "Other Publications", line 9, after "12/482,689", insert --,--, therefor On Title page 2, in column 1, Item [56] under "Other Publications", line 9, after "2010", insert --"--, therefor On Title page 2, in column 1, Item [56] under "Other Publications", line 11, before "U.S.", insert --"--, therefor On Title page 2, in column 1, Item [56] under "Other Publications", line 12, after "2010", insert --"--, therefor On Title page 2, in column 1, Item [56] under "Other Publications", line 13, before "U.S.", insert --"--, therefor On Title page 2, in column 1, Item [56] under "Other Publications", line 14, after "2010", insert --"--, therefor On Title page 2, in column 1, Item [56] under "Other Publications", line 15, before "U.S.", insert --"--, therefor On Title page 2, in column 1, Item [56] under "Other Publications", line 16, after "2011", insert --"--, therefor On Title page 2, in column 1, Item [56] under "Other Publications", line 17, before "Chinese", insert --"--, therefor On Title page 2, in column 1, Item [56] under "Other Publications", line 18, after "2011", insert --"--, therefor On Title page 2, in column 1, Item [56] under "Other Publications", line 19, before "Chinese", insert --"--, therefor On Title page 2, in column 1, Item [56] under "Other Publications", line 20, after "2011", insert --"--, therefor On Title page 2, in column 1, Item [56] under "Other Publications", line 21, before "International", insert --"--, therefor On Title page 2, in column 1, Item [56] under "Other Publications", line 22, after "2005", insert --"--, therefor On Title page 2, in column 2, Item [56] under "Other Publications", line 1, before "International", insert --"--, therefor On Title page 2, in column 2, Item [56] under "Other Publications", line 3, after "2006", insert --"--, therefor On Title page 2, in column 2, Item [56] under "Other Publications", line 13, delete "at:http://" and insert --at http://--, therefor On Title page 2, in column 2, Item [56] under "Other Publications", line 15-16, delete "Office Action received for U.S. Appl. No. 10/750,587, mailed on Nov. 19, 2007, 15 pages." and insert --"U.S. Appl. No. 10/750,587, Office Action mailed Nov. 19, 2007", 15 pages.--, therefor On Title page 2, in column 2, Item [56] under "Other Publications", line 17-18, delete "Response to office Action for U.S. Appl. No. 10/750,587, filed Feb. 8, 2008, 15 pages." and insert --"U.S. Appl. No. 10/750,587, Response to office Action filed Feb. 8, 2008", 15 pages.--, therefor On Title page 2, in column 2, Item [56] under "Other Publications", line 19-20, delete "Preliminary Amendment for the U.S. Appl. No. 10/750,587, filed Aug. 6, 2004, 3 pages." and insert --"U.S. Appl. No. 10/750,587, Preliminary Amendment filed Aug. 6, 2004", 3 pages.--, therefor On Title page 2, in column 2, Item [56] under "Other Publications", line 21-22, delete "Notice of Allowance received for U.S. Appl. No. 10/750,587, mailed on Mar. 17, 2008, 11 pages." and insert --U.S. Appl. No. 10/750,587, Notice of Allowance mailed Mar. 17, 2008", 11 pages.--, therefor On Title page 2, in column 2, Item [56] under "Other Publications", line 31-32, delete "International Search Report received for PCT Patent Application No. PCT/US2004/025509, mailed on Mar. 29, 2005,3 pages." and insert --"International Application No. PCT/US2004/025509, International Search Report mailed Mar. 29, 2005", 3 pages.--, therefor On Title page 2, in column 2, Item [56] under "Other Publications", line 37-38, delete "Office Action received for Japanese Patent Application No. 2006-523250, mailed on Aug. 16, 2008, 12 pages." and insert --"Japanese Patent Application No. 2006-523250, Office Action mailed Aug. 16, 2008", 12 pages.--, therefor On Title page 2, in column 2, Item [56] under "Other Publications", line 39-40, delete "Office Action received for Japanese Patent Application No. 2006-523250 , mailed on Mar. 30, 2009, 4 pages." and insert --"Japanese Patent Application No. 2006-523250, Office Action mailed Mar. 30, 2009", 4 pages.--, therefor On Title page 2, in column 2, Item [56] under "Other Publications", line 45-46, delete "Office Action received for Chinese Patent Application No. 200480029297.9, mailed on Oct. 30, 2009, 8 pages." and insert --"Chinese Patent Application No. 200480029297.9, Office Action mailed Oct. 30, 2009", 8 pages.--, therefor On Title page 2, in column 2, Item [56] under "Other Publications", line 47-48, delete "Notice of Allowance received for U.S. Appl. No. 12/482,671, mailed on Jun. 17, 2010, 7 pages." and insert --U.S. Appl. No. 12/482,671, Notice of Allowance mailed Jun. 17, 2010", 7 pages.--, therefor On Title page 2, in column 2, Item [56] under "Other Publications", line 49-50, "Ex Parte Quayle office action received for U.S. Appl. No. 12/482,671, mailed on Mar. 26, 2010, 5 pages." and insert --U.S. Appl. No. 12/482,671, Ex Parte Quayle office action mailed Mar. 26, 2010", 5 pages.--, therefor On Title page 2, in column 2, Item [56] under "Other Publications", line 51-52, delete "Supplemental Notice of Allowability received for U.S. Appl. No. 12/118,838, mailed on Feb. 18, 2010, 3 pages." and insert --"U.S. Appl. No. 12/118,838, Supplemental Notice of Allowability mailed Feb. 18, 2010", 3 pages.--, therefor On Title page 2, in column 2, Item [56] under "Other Publications", line 53-54, delete "Notice of Allowance received for U.S. Appl. No. 12/118,838, mailed on Jan. 28, 2010, 7 pages." and insert --"U.S. Appl. No. 12/118,838, Notice of Allowance mailed Jan. 28, 2010", 7 pages.--, therefor On Title page 2, in column 2, Item [56] under "Other Publications", line 55-56, delete "Office Action mailed received for Chinese Patent Application No. 200480029297.9, mailed on Feb. 27, 2009, 22 pages." and insert --Chinese Patent Application No. 200480029297.9, Office Action mailed Feb. 27, 2009, 22 pages.--, therefor In the Claims In column 11, line 45, in Claim 1, delete "(MIMO;)" and insert --(MIMO)--, therefor